United States Patent [19]

Ogawa et al.

[11] Patent Number: 4,907,178
[45] Date of Patent: Mar. 6, 1990

[54] METHOD FOR DETECTING A REFERENCE ANGULAR POSITION OF A ROTARY BODY

[75] Inventors: Sumitaka Ogawa, Wako; Masami Kawabe, Hanno; Masanori Nakamura, Hanno; Hidenori Maeda, Hanno; Yoshio Morita, Hanno, all of Japan

[73] Assignees: Honda Giken Kogyo Kabushiki Kaisha; Shindengen Kogyo Kabushiki Kaisha, both of Tokyo, Japan

[21] Appl. No.: 168,090

[22] Filed: Mar. 14, 1988

[30] Foreign Application Priority Data

Oct. 27, 1987 [JP] Japan ................................. 62-271399
Oct. 27, 1987 [JP] Japan ................................. 62-271398

[51] Int. Cl.⁴ ............................ G01B 7/00; F02P 1/02
[52] U.S. Cl. ................................... 364/559; 123/414; 123/417
[58] Field of Search ............... 364/431.05, 431.10, 364/559; 250/231 SE; 123/414, 417, 418, 612

[56] References Cited

U.S. PATENT DOCUMENTS

| 4,328,463 | 5/1982 | Avins ............................ 250/231 SE |
| 4,379,221 | 4/1983 | Avins et al. ................... 250/231 SE |
| 4,496,936 | 1/1985 | Kramer ......................... 250/231 SE |
| 4,519,362 | 5/1985 | Arakawa et al. .................. 123/414 |
| 4,678,910 | 7/1987 | Hara et al. ..................... 250/231 SE |
| 4,742,332 | 5/1988 | Schroeder et al. ............. 364/559 X |
| 4,796,208 | 1/1989 | Kumagai et al. .................... 364/559 |

Primary Examiner—Felix D. Gruber
Attorney, Agent, or Firm—Pollock, Vande Sande & Priddy

[57] ABSTRACT

A method of detecting a reference angular position of a rotary body. Two detectable portions are spaced apart from each about the periphery by a predetermined angle in the rotational direction thereof. Two detection signals and produced from two detectors spaced apart from each other by the same angular distance as the detectable portions in the rotational direction of the rotary body in the vicinity of the locus of the detectable portions. It is first detected that at least one of the detectors produces a detection signal and thereafter it is determined that the rotary body takes a reference angular position when both of the detectors produce the detection signals.

10 Claims, 12 Drawing Sheets

FIG.18

METHOD FOR DETECTING A REFERENCE ANGULAR POSITION OF A ROTARY BODY

BACKGROUND OF THE INVENTION (1) Field of the Invention

The present invention relates to a method for detecting a reference angular position of a rotary body such as the crankshaft of an internal combustion engine mounted on a motorcycle.

(2) Description of a Related Art

Figure 1:
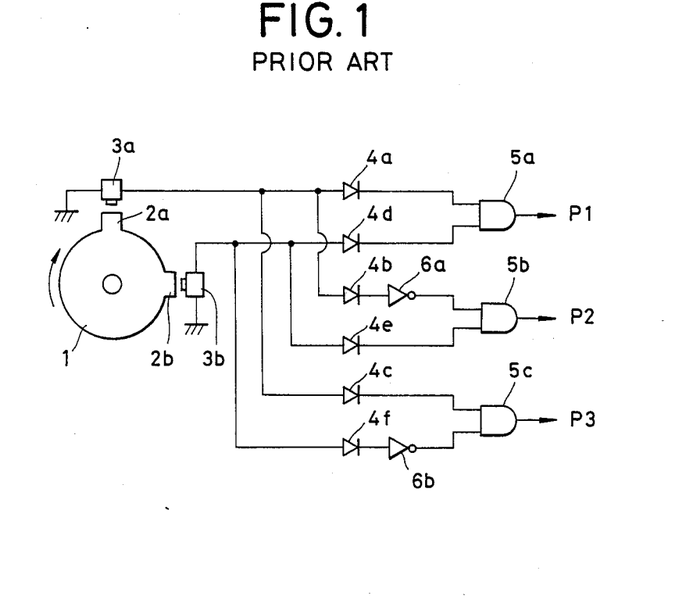
FIG. 1 is a circuit diagram showing a prior-art system for obtaining a reference angular position signal representing that a rotary body reaches a reference angular position.
Figure 2A:
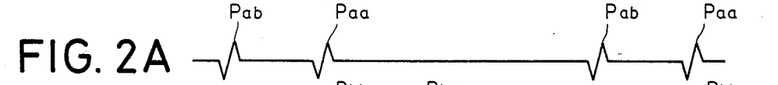
Figure 2B:
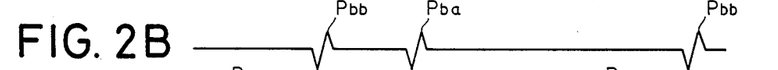
Figure 2C:
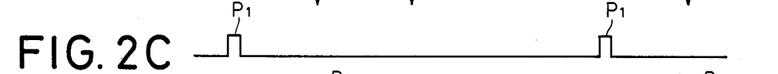
Figure 2D:
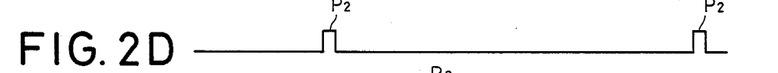
Figure 2E:
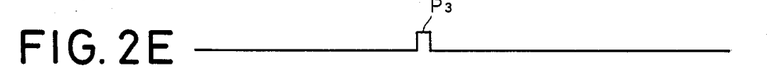

A system for detecting a reference angular position of a rotary body is shown in FIG. 1, which system has been disclosed in a Japanese Utility Model Application No. 62-32216 filed by the same applicant as the present application. As shown, two magnetic projections 2a and 2b are formed distantly from each other on the periphery of a rotary body 1 along the circumferential direction thereof. Two detectors 3a and 3b are formed in the vicinity of a locus of the two magnetic projections 2a and 2b. The detectors 3a and 3b respectively produce output signals having waveforms respectively shown in FIGS. 2A and 2B. The two output signals are supplied through diodes 4a through 4f and inverters 6a and 6b to AND gates 5a, 5b and 5c which respectively produce reference angular pulses $P_1$, $P_2$ and $P_3$ having waveforms respectively shown in FIGS. 2C through 2E.

Figures 3A, 3B, 3C:
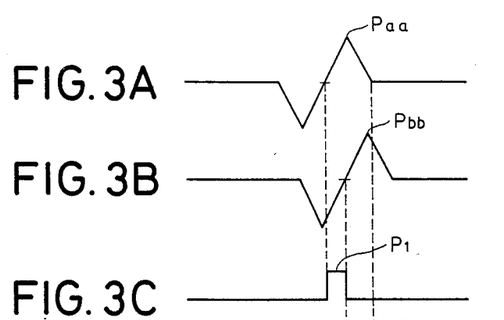
Figure 3D:
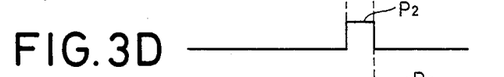
Figure 3E:
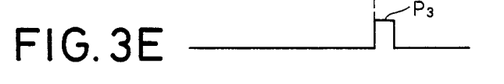

However, it has been revealed that the output signals Paa and Pbb of the detectors 3a and 3b do not necessarily appear at the same time but appear with a certain time difference even at a timing when the reference angular pulse $P_2$ appears, as seen from FIGS. 3A and 3B. This is because some manufacturing errors inevitably exist in the arrangement including the magnetic projections 2a and 2b and the detectors 3a and 3b. Because of the time difference between the pulses Paa and Pbb, there appear the pulses $P_1$ and $P_3$ from the AND gates 5a and 5c before and after the pulse $P_2$. These pulses $P_1$ and $P_3$ cause erroneous detection of a reference angular position in the later stage such as an ignition timing controller (not shown).

It has further been revealed that erroneous detection of the reference angular position will take place due to a reverse rotation of the rotary body in case the rotary body is the crankshaft of the motorcycle.

SUMMARY OF THE INVENTION

Accordingly, it is a primary object of the subject invention to provide a method of correctly detecting a reference angular position of a rotary body on the periphery of which two detectable portions, which may be magnetic projections, are spaced apart distantly from each other by a predetermined angle in the rotational direction thereof, by using two detection signals produced from two detectors spaced apart from each other by the same angular distance as the detectable portions in the rotational direction of the rotary body in the vicinity of the locus of the detectable portions, even if there exist some difference between the angular distances of the detectable portions and the detectors.

It is a second object of the subject invention to provide a method of correctly detecting a reference angular position of a rotary body even when the rotary body rotates in the reverse direction of normal rotation, by using two detection signals obtained from two detectors which are positioned distantly from each other by a predetermined angular distance in the rotational direction of the rotary body in the vicinity of a locus of two detectable magnetic projections formed on the periphery of the rotary body in the rotational direction thereof spaced apart from each other by the same angular distance as the two detectors.

It is a third object of the subject invention to provide an ignition timing control method for controlling the ignition timing of an internal combustion engine, by using two detection signals obtained from two detectors spaced apart from each other by a predetermined angular distance in the rotational direction of a rotary body rotatable with the engine operation in the vicinity of a locus of two detectable pieces formed on the periphery of the rotary body spaced apart from each other by the same angular distance as the two detectors in the rotational direction thereof.

According to a first aspect of the subject invention, it is first detected that at least one of the detectors produces a detection signal and thereafter it is detemined that the rotary body takes a reference angular position when both of the detectors produce the detection signals.

According to a second aspect of the subject invention, a stage counter is provided which up-counts or down-counts by a unit number in response to either one of the two detection signals issued from the two detectors and an abnormality is determined when any detection signal appears which does not comply with the stage count value held in the stage counter.

According to a third aspect of the subject invention, the output signals from the two detectors are sampled as sample values (x,y) and a determination is made with respect to the rotational state of the rotary body in view of the sequential changing manner of the sample values (x,y).

BRIEF DESCRIPTION OF THE DRAWINGS

FIGS. 2A through 3E are diagrams showing waveforms of output signals issued from the detectors shown in FIG. 1.

FIGS. 5A through 5D are diagrams showing waveforms of output signals from the detectors shown in FIG. 4 and input signals to input ports of a microcomputer shown in FIG. 4.

DETAILED DESCRIPTION OF EMBODIMENTS

Figure 4:
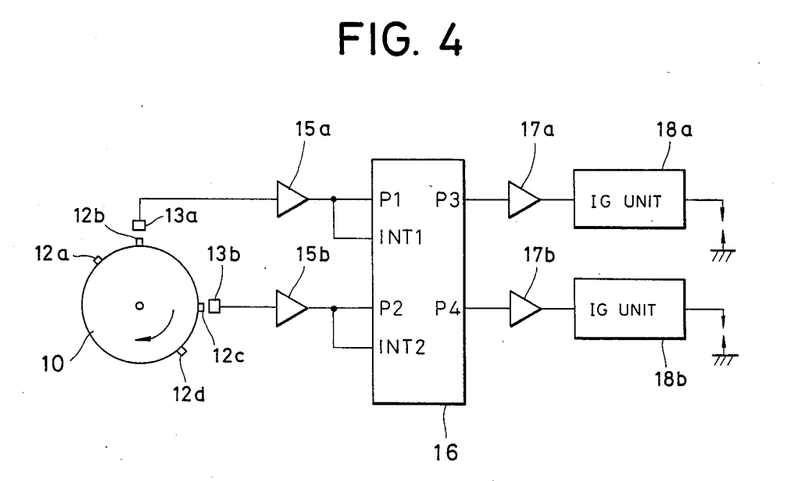
FIG. 4 is a block diagram showing an ignition system for a 2-cycle engine to which the subject invention is applied.

Referring now to FIG. 4, there is shown an ignition system for a 2-cycle engine with two cylinders. A rotary body 10 is rotatable in synchronism with the crank shaft (not shown) of the engine. Four detectable portions such as magnetic projections 12a, 12b, 12c and 12d are mounted on the periphery of the rotary body 10 in the circumferential i.e. rotational direction. Two of the detectable portions 12b and 12c are distant from each other by an angle of 90°. The detectable portion 12a is counterclockwise distant from the detectable portion 12b by an angle of 45 and the detectable portion 12d is clockwise distant from the detectable portion 12b by 45°. Two detectors such as magnetic pick-ups 13a and 13b are spaced apart from each other by the angle of 90° in the circumferential direction of the rotary body 10 in the vicinity of the locus of the detectable portions 12a through 12d. In this case, the detectors 13a and 13b respectively face the detectable portions 12b and 12c when the crank shaft reaches a reference angular position corresponding to the top dead center of the first cylinder.

The detectors 13a and 13b respectively produce detection pulse signals upon the detection of the respective detectable portions 12a through 12d, which pulse signals are applied to the controller 16 through amplifiers 15a and 15b which function as waveshapers. The controller 16 has input ports $P_1$, $P_2$, INT1 and INT2 for receiving the pulse signals and executes computations governed by main and sub-routines described hereinafter so as to produce ignition command signals from output ports $P_3$ and $P_4$. The ignition command signals are supplied through amplifiers 17a and 17b to ignition units 18a and 18b which in turn exert high voltage pulses to the ignitors of the respective cylinders for performing ignition in the respective cylinders. The input port INT1 and INT2 are adapted to receive the detection pulse signals as merely interruption command signals.

Figure 5A:
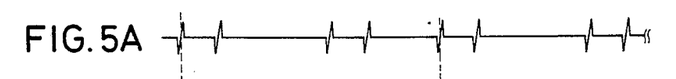
Figure 5B:
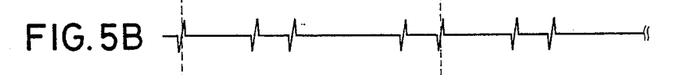
Figure 5C:
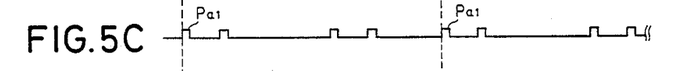
Figure 5D:
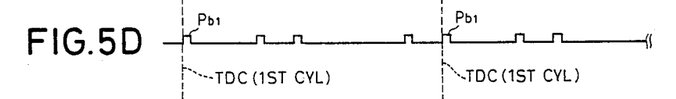

During operation of the engine, the detectors 13a and 13b respectively produce the detection pulse signals having such waveforms as shown in FIGS. 5A and 5B. These detection pulse signals are supplied through the amplifiers 15a and 15b to the input ports $P_1$, INT1 and $P_2$, INT2 of the controller 16. FIGS. 5C and 5D respectively show waveforms of the input pulses supplied to the input ports $P_1$, INT1 and $P_2$, INT2.

In FIGS. 5C and 5D, the leading pulses of the consecutive pairs of pulses from the detector 13a are referred to by $P_{a1}$ and the trailing pulses of the consecutive pairs of pulses from the detector 13b are referred to by $P_{b1}$. When those pulses $P_{a1}$ and $P_{b1}$ are simultaneously supplied to the controller 16, then the controller 16 will determine that the rotary body 10 has reached the reference angular position.

The controller 16 may be constituted by a microcomputer including CPU, ROM and RAM and executes computations governed by various programs stored in the ROM and/or RAM.

FIGS. 6 through 9 shown a main routine program and sub-routine program to be executed by the controller 16.

Figure 6:
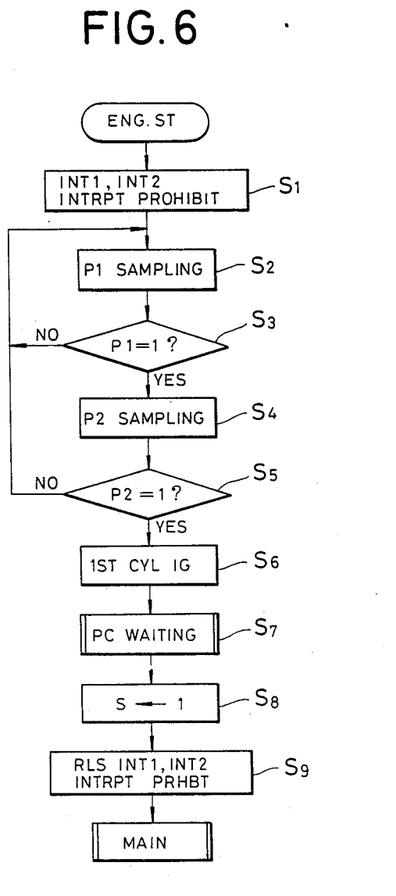
FIG. 6 is a flow chart showing a sub-routine to be executed by the microcomputer of FIG. 4 upon the engine-start.

When the ignition key switch (not shown) is made ON, a source voltage is supplied to the ignition control system including the controller 16 which then executes consecutive steps contained in the engine-start sub-routine of FIG. 6 in synchronism with the clock pulses of a constant frequency. In the engine-start sub-routine, the initialization is first made, and INT1 and INT2 interruptions are prohibited at the same time when the supply of the source voltage (step $S_1$) is applied to the engine. Next a level of the input signal to the input port $P_1$ is sampled until the input signal $P_1$ takes a high level i.e. a logic "1" level (steps $S_2$, $S_3$). When the input signal $P_1$ takes the logic "1" level then the input signal $P_2$ is sampled until the input signal $P_2$ takes the logic "1" level (steps $S_4$, $S_5$), thereby awaiting that both of the input signals $P_1$ and $P_2$ take the logic "1" level. With this arrangement the reference angular position of the rotary body 10, i.e. the top dead center of the first cylinder can be correctly detected even when the input pulses corresponding to the reference angular position are supplied to the input ports $P_1$ and $P_2$ with a time difference because of manufacturing errors in the assembly including the rotary body 10, the detectable portions 12a through 12d and the detectors 13a and 13b.

Figure 7:
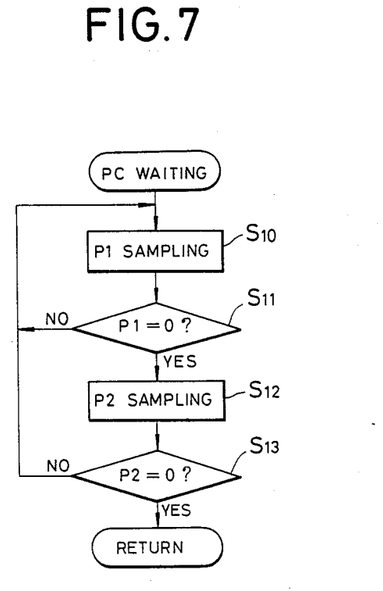
FIG. 7 is a flow chart showing a PC waiting sub-routine included by the engine start sub-routine.
Figure 8:
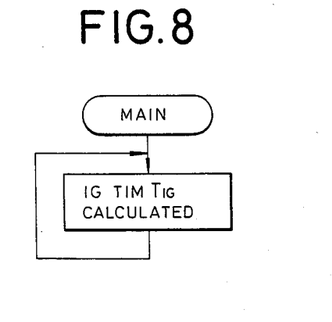
FIG. 8 is a flow chart showing a main routine constantly executed by the microcomputer of FIG. 4.

After both of the input signals $P_1$ and $P_2$ take the logic "1" level, the ignition command is issued from the controller 16 to ignite the first cylinder (step $S_6$). Thereafter, the PC waiting sub-routine shown in FIG. 7 is executed (step $S_7$). The PC waiting sub-routine is to be executed for detecting that both of the input signals $P_1$ and $P_2$ take the lower level, i.e. the logic "0" level. In this PC waiting sub-routine, the input signal $P_1$ is sampled repeatedly until the input signal $P_1$ takes the logic "1" level (steps $S_{10}$, $S_{11}$). When the input signal $P_1$ takes the logic "1" level, then the input signal $P_2$ is sampled repeatedly until the input signal $P_2$ takes the logic "1" level (steps $S_{12}$, $S_{13}$). When the input signal $P_2$ takes the logic "1" level then this PC waiting sub-routine terminates so as to return to the engine-start sub-routine. After termination of the PC waiting sub-routine (step $S_7$), the stage count value $S_1$ is made to be "1" (step $S_8$). Then, the prohibition of the interruption by INT1 or INT2 is released (step $S_9$) and then the main routine of FIG. 8 is entered.

In the main routine, an ignition timing $T_{IG}$ is calculated as a function of a time period $T_S$ measured in the INT1/INT2 interruption sub-routine described hereinafter or otherwise the ignition timing $T_{IG}$ is determined by searching a data map based on the time period $T_S$.

Figure 9:
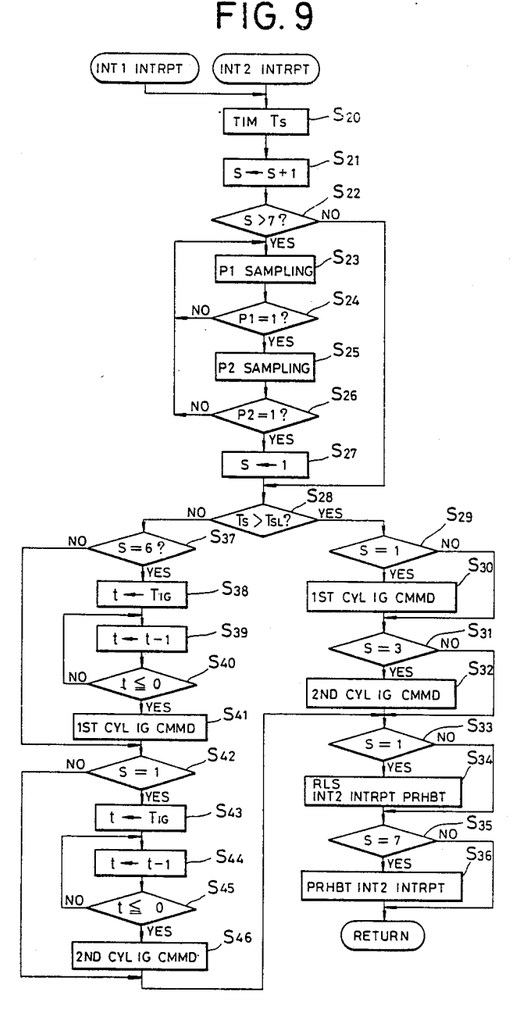
FIG. 9 is a flow chart showing an INT1/INT2 interruption sub-routine to be executed by the microcomputer while interrupting the main routine in response to either one of input pulses supplied to INT1 and INT2 input ports of the microcomputer of FIG. 4.

In FIG. 9, there is illustrated the INT1/INT2 interruption sub-routine which is executed in response to the logic "1" pulse supplied to the INT1 or INT2 input port of the controller 16. When the logic "1" pulse is supplied to the INT1 and/or INT2 input ports, this INT-1/INT2 sub-routine starts while interrupting the main routine. At first, the time $T_S$ is measured which represents a time period lapsed from the previous interruption (step $S_{20}$). This measure may be performed by reading a count value of a time counter which is reset and re-started in response to the INT1 and/or INT2 pulses. Then, the stage count value S is increased by "1" (step $S_{21}$), and a determination whether the stage count value S exceeds "7" or not is made in the next step $S_{22}$. When it is determined the stage count value S exceeds the value "7", the input signals $P_1$ and $P_2$ are sampled until both of them take the logic "1" level (steps $S_{23}$ through $S_{26}$). When both of the input signals $P_1$ and $P_2$ take the logic "1" level, the stage count value S is made to be "1" (step $S_{27}$), since this state corresponds to the state in which the rotary body takes the reference angular position. As long as the stage count value S is smaller than "7", theses steps $S_{23}$ through $S_{26}$ are bypassed. In the next step $S_{28}$, the time $T_S$ is compared with a time $T_{SL}$ which corresponds to an idle state of the 2-cycle engine. When the time $T_S$ is larger than the time $T_{SL}$, then it is determined that the engine rotational speed is lower than the idle speed and the operation advances to the step $S_{29}$. In the step $S_{29}$, it is determined whether the stage count value S is equal to "1" or not. When the stage count value S equals "1" then the first cylinder ignition command is issued at a step $S_{30}$. When the stage count value S is not equal to "1" then the step $S_{30}$ is bypassed. In the step $S_{31}$, it is determined whether the stage count value S equals "3". When the stage count value S is equal to "3" then the second cylinder ignition command is issued at the step $S_{32}$. As far as the stage count value S is not equal to "3", step $S_{32}$ is bypassed. It is in this instance to be understood that the top dead center for the second cylinder is delayed by 90° in crank angle from the top dead center for the first cylinder. In the next step, $S_{33}$, it is determined whether the stage count value S is equal to "1" or not. When the stage count value S is equal to "1", then the prohibition of the interruption in response to the INT2 pulse is released (step $S_{34}$). When the stage count value S is not equal to "1", step $S_{34}$ bypassed. On the other hand, the stage count value S is determined to be equal to "7" at a step $S_{35}$, then the interruption in response to the INT2 pulse is prohibited at a step $S_{36}$. When the stage count value S is not equal to "7", step $S_{36}$ is bypassed.

It is to be understood that undue double execution of the INT1/INT2 sub-routine can be avoided by the prohibition of the interruption in response to INT2 pulse at the stage "7" in which the INT1 and INT2 pulses may appear with a slight time difference.

When, in the step $S_{28}$, it is determined that the measured time $T_S$ is equal to or smaller than the predetermined time period $T_{SL}$, then the current engine speed is higher than the idle engine speed and the operation advances to the step $S_{37}$. In the step $S_{37}$, it is determined whether the stage count value S is equal to "6" or not. The stage "6" corresponds to an angular region of from BTDC (before top dead center) 90° to 45° BTDC in this embodiment, as seen from FIG. 5E. When it is determined that the stage count value S is equal to "6" in step $S_{37}$, then a count value t of a down counter (not shown) incorporated in the controller 16 is set to the ignition timing value $T_{IG}$ (step $S_{38}$). A unit value "1" is subtracted from the count value t repeatedly until the count value t reaches or extends below zero (step $S_{39}$, $S_{40}$). When the count value t reaches or extends below zero the first cylinder ignition command is issued (step $S_{41}$). When, on the other hand, it is determined that the stage count value S is not "6" at the step $S_{37}$, the steps $S_{38}$ through $S_{41}$ are bypassed. In the preceding step $S_{42}$, it is determined whether the stage count value S is equal to "1" or not. When the count value S is equal to "1" i.e. this state corresponds to the angular position before TDC for the second cylinder, the count value t is set to $T_{IG}$ from which the unit value "1" is repeatedly subtracted until the count value reaches or extends below zero (steps $S_{43}$ through $S_{45}$). When it is determined that the count value S reaches or extends below zero, the second cylinder ignition command is issued at step $S_{46}$. When it is determined that the stage count value S is not equal to "1", the steps $S_{43}$ through $S_{46}$ are bypassed. Thereafter, the operation advances to the step $S_{33}$.

Figure 5E:
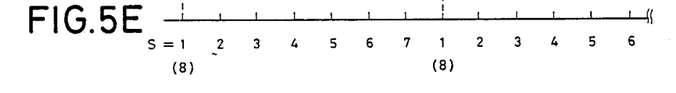
FIG. 5E is a diagram showing stage numbers corresponding to the signals appearing in the ignition system of FIG. 4.
Figure 11:
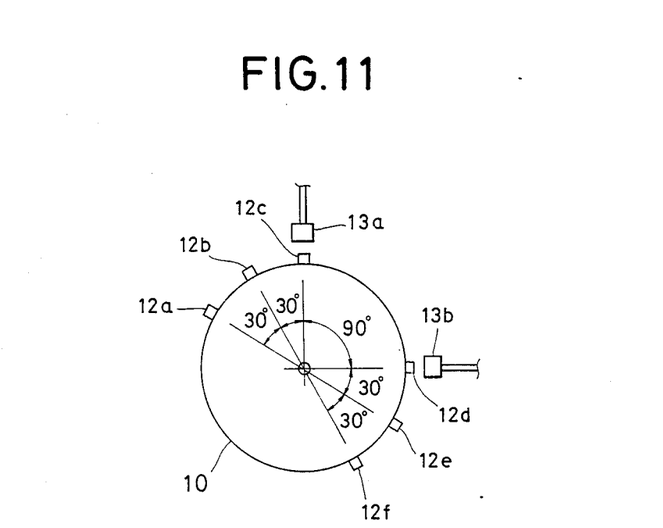
FIG. 11 is another arrangement of detectable pieces mounted on a rotary body and two detectors for detecting the detectable pieces.

In the above-mentioned embodiment, four detectable projections 12–12d are mounted on the rotary body 10 so as to form seven stages, as clearly seen from FIG. 5E. Another arrangement can be made in which six detectable projections 12a, 12b, 12c, 12d, 12e, and 12f formed on the periphery of the rotary body 10. With this arrangement, the angular positions contained by one rotation of the rotary body 10 are divided into eleven stages thereby to obtain more detailed angular information.

The detectable projections may be formed by slits formed in a rotary disc rotatable with the rotary body 10 while the detectors 13a and 13b are photo-couplers respectively sandwiching the rotary disc.

It is on the other hand a problem that the crank shaft of the 2-cycle engine may rotate reversely.

Accordingly, the applicants have conceived of another arrangement which can detect the reference angular position even in the event of a reverse rotation of the rotary body 10, which arrangement will be described hereinafter.

Figure 12:
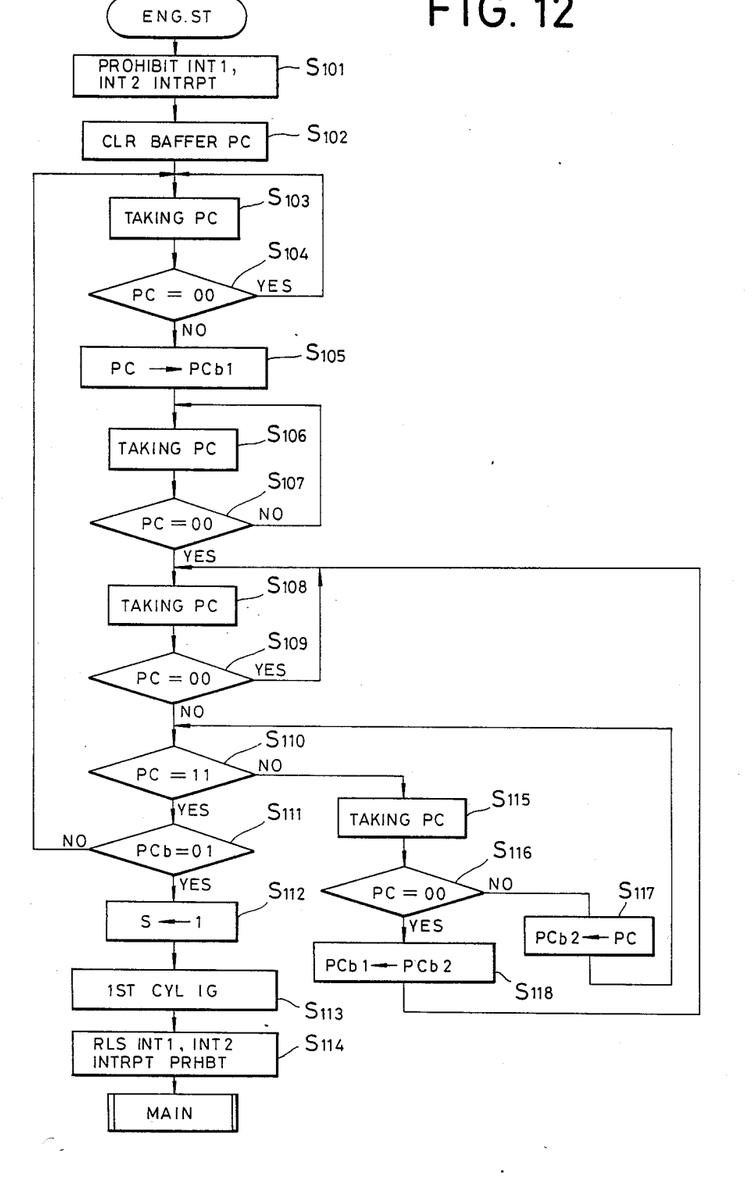
FIG. 12 is a flow chart showing another engine-start sub-routine to be executed by the microcomputer of FIG. 4.

In FIG. 12, there is shown another engine-start subroutine which is executed in synchronism with constant frequency clock pulses within the controller 16. In the first step $S_{101}$, the initialization is made and also the interruption by any sub-routine triggered by the INT1 pulse or INT2 pulse is prohibited. In the next step $S_{102}$, a PC buffer memory is cleared which temporarily stores PC values (x,y), where the parameter x represents the value of the $P_1$ signal and the parameter y represents the value of the $P_2$ signal. By sampling the $P_1$ signal and the $P_2$ signal, the PC values (x,y) are obtained until the PC values (x,y) become any values other than (0,0). When the PC values (x,y) become (1,1) (1,0) or (0,1), then the particular PC values are stored as $P_{Cb1}$ in the PC buffer memory (step 105). Thereafter, the PC values are again obtained by sampling the $P_1$ and $P_2$ signals (step $S_{106}$) until the PC values (x,y) become (0,0) (step $S_{107}$). Upon determining that the PC values are (0,0), the $P_1$ and $P_2$ signals are again sampled until the PC values become any values other than (0,0) (step $S_{109}$). Upon determining that the PC values are not (0,0), it is determined that the PC values are equal to (1,1) at a step $S_{110}$. It is in this instance to be noted that the PC values are equal to (1,1) when the rotary body 10 reaches the reference angular position corresponding to the TDC of the first cylinder. When it is determined that the PC values are (1,1), it is determined whether the $PC_{b1}$ values have been (0,1) or not (step $S_{111}$). When the $PC_{b1}$ values have been (0,1) then it can be said that the rotary body 10 has rotated in the normal direction. It should now be understood that the PC values change from (0,1) through (0,0) up to (1,1) of the reference angular position, under a normal rotation of the rotary body 10. Thus, the rotation of the rotary body 10 can be determined as normal when the PC values become (1,1) under the condition that the $PC_{b1}$ values are (0,1). When the PC values become (1,1) with the $PC_{b1}$ values of other values than (0,1), then it can be said that the rotary body 10 undergoes an abnormal rotation such as a reverse rotation. When the abnormal rotation of the rotary body 10 is determined at the step $S_{111}$, the operation returns to the PC values sampling at the step $S_{103}$ so as to restart this reference angular position detection operation. When the normal rotation of the rotary body 10 is detected at the step $S_{111}$, the stage count value S is made to be "1" at a step $S_{112}$ and the ignition command is issued from the output port $P_3$ thereby causing the ignition of the first cylinder (step $S_{113}$). Then the prohibition of the INT1/INT2 interruption (step $S_{114}$) is released and the operation advances to the main routine of FIG. 8.

When, on the other hand, the PC values are not (1,1), the $P_1$ and $P_2$ signals are again sampled to obtain new PC values at a step $S_{115}$ and it is determined whether the new PC values are (0,0) or not at a step $S_{116}$. When the new PC values are not equal to (0,0), the new PC values are stored as $PC_{b2}$ values in the PC buffer memory (step $S_{117}$) and the operation returns to the step $S_{110}$. Therefore the steps $S_{116}$, $S_{117}$, $S_{110}$ and $S_{115}$ are repeatedly executed until the PC values become (0,0). When the PC values become (0,0), the $PC_{b1}$ values are substituted for the $PC_{b1}$ values at a step $S_{118}$ and the operation returns to the step $S_{108}$. It is now to be understood that the repeated executions of the steps $S_{115}$ through $S_{118}$ the reference angular position i.e. the TDC of the first cylinder can be detected even when the $P_1$ and $P_2$ signals take a high level with a time difference as those pulses $P_{a1}$ and $P_{b1}$, as seen from FIG. 10 because of the manufacturing errors.

Figure 13:
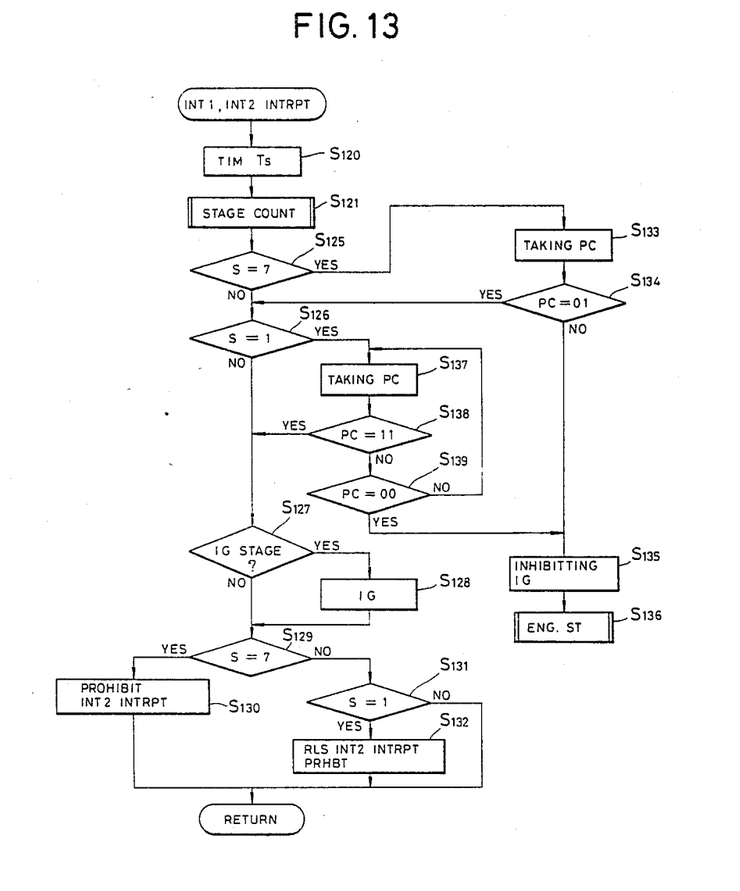
FIG. 13 is a flow chart showing another INT1/INT2 interruption sub-routine different from that of FIG. 9.
Figure 14:
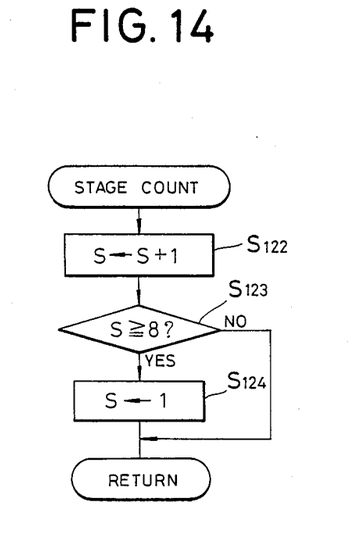
FIG. 14 is a flow chart showing a stage-count sub-routine included by the sub-routine of FIG. 13.

In FIG. 13, there is shown another INT1/INT2 interruption sub-routine which is executed in response to either INT1 or INT2 pulse supplied to the input port INT1 or INT2 while interrupting the main routine. In this INT1/INT2 interruption sub-routine, a time period $T_S$ from the previous interruption to the current interruption is measured at a step $S_{120}$. Then, a stage count sub-routine shown in FIG. 14 is executed. In this stage count sub-routine, the stage count value S is increased by a unit value "1" (step $S_{122}$) and then it is determined whether the increased stage count value S reaches or exceeds "8" or not (step $S_{123}$). When the stage count value S is determined to be equal or larger than "8" then the stage count value S is reset to "1" (step $S_{124}$). After execution of the stage count sub-routine, it is determined whether the stage count value S is equal to "7" or not (step $S_{125}$). When, in this instance, the stage count value S is determined not to be equal to "7", a further determination is made whether the stage count value S is equal to 1 or not (step $S_{126}$). When the stage count value S is determined not to be equal to "1", a further determination is made whether the stage count value S is equal to an ignition stage (step $S_{127}$).

In this embodiment, an arrangement is made wherein the TDC timings for the first and second cylinders respectively take place upon arrival of the stage count value S at "1" and "3". Namely, the TDC position for the second cylinder is delayed by 90° in crank angle from the TDC position for the first cylinder. Thus, the ignition stage for the first and second cylinders may be S=6 and S=1 stages, respectively. In this case, the determinations for the ignition stages are made at 90° BTDC for the respective cylinders.

When, at the step $S_{127}$, the stage count value S is determined to be equal to the ignition stage value "1" or "6", an ignition operation is made (step $S_{128}$). This ignition operation is performed by setting a count value t of a down-counter to the ignition timing $T_{IG}$ obtained in the main routine of FIG. 8, and decreasing the count value t by the unit value "1" cyclically until the count value t becomes zero or below zero. This IG operation at the step $S_{128}$ is substantially the same as the operation made by the steps $S_{38}$ through $S_{41}$ of FIG. 9. Upon detection of a state that the count value t is equal to or smaller than zero, the ignition command is issued from the output port $P_3$ or $P_4$ thereby causing ignition at the first or second cylinder.

When, at a step $S_{129}$, the stage count value S is determined to be "7", the interruption by INT2 pulse supplied to the INT2 port is prohibited (step $_{130}$). When, to the contrary, the stage count value S is determined not to be equal to "7" at the step $S_{129}$, a determination is made whether the stage count value S is equal to "1" or not (step $S_{131}$). When the count value S is determined to be equal to "1", the prohibition made at the step $S_{130}$ is released to allow the INT2 interruption (step $S_{132}$).

Figure 10A:
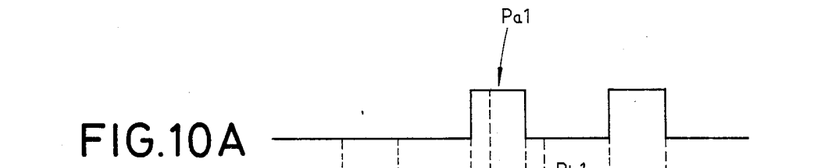
FIGS. 10A and 10B are diagrams showing waveforms of the output signals of the detectors shown in FIG. 4.
Figure 10B:
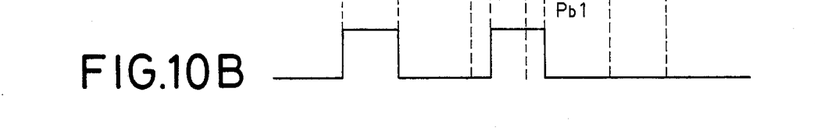

With such arrangement that the interruption by INT2 pulse is prohibited at S=7, the INT1/INT2 sub-routine will not be doubly triggered even when the pulse signals $P_{a1}$ and $P_{b1}$ appear at different timings, as shown in FIG. 10, around the reference angular position.

When, at the step $S_{125}$, it is determined that the stage count value $S_7$ is equal to "7", the PC values are newly sampled (step $S_{133}$) and it is determined whether the new PC values are equal to (0,1) (step $S_{134}$). When the new PC values are (0,1), the rotation of the rotary body 10 is normal and the operation advances to the step $S_{126}$. When, however, the new PC values are not equal to (0,1) there is a possibility that the rotation of the rotary body 10 is abnormal, so that any ignition is immediately inhibited at a step $S_{135}$ and the operation returns to the engine start sub-routine of FIG. 12 (step $S_{136}$).

When, on the other hand, the stage count value S is determined to be equal to "1", $P_1$ and $P_2$ signals are sampled to obtain new PC values (step $S_{137}$) and a determination is made whether the new PC values are equal to (1,1) or not (step $S_{138}$). When the new PC values are not equal to (1,1), a determination is made whether the PC values are equal to (0,0) or not (step $S_{139}$). When the PC values are not determined to be equal to (0,0) at the step $S_{139}$, the operation returns to the step $S_{137}$. Since, as seen from FIG. 5, the PC values should be (1,1) at S=1, the normal rotation of the rotary body 10 is confirmed by determination that the PC values are (1,1) at the step $S_{138}$ and the operation advances to the step $S_{127}$. Since, as seen from FIG. 10, there is a possibility that those pulses $P_{a1}$ and $P_{b1}$ are supplied to the controller 16 at different timings at S=1, a possibility remains that the PC values become (1,1) as long as the PC values do not become (0,0) and accordingly the system waits until the PC values become (1,1). When, however, the PC values become (0,0) without becoming (1,1), this means that the PC values occur which never appear during the normal rotation of the rotary body 10, then a determination of an abnormal rotation of the rotary body 10 is made and the operation is advanced to the step $S_{135}$.

It is now to be understood that abnormality in the rotation of the rotary body 10 is detected by determining whether the PC values become values corresponding to the states of S=1 or 7, or not.

Figure 15:
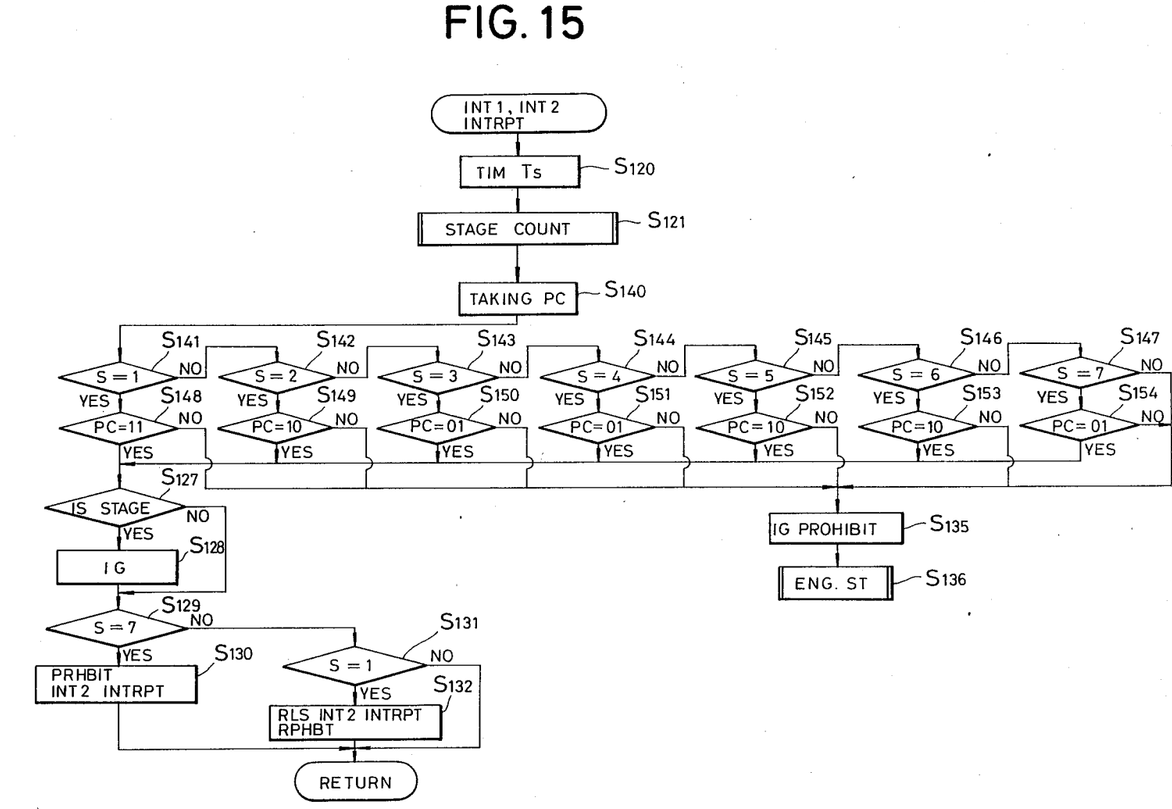
FIG. 15 is a flow chart showing a still further INT-1/INT2 interruption sub-routine.

In FIG. 15, there is shown another INT1/INT2 interruption sub-routine which may be substituted for the sub-routine of FIG. 13. Those steps within the sub-routine of FIG. 15 corresponding to those steps within the sub-routine of FIG. 13 are designated by the corresponding reference numerals and will not be explained hereinafter. The sub-routine of FIG. 15 is executed while interrupting the main routine in response to either one of the pulses supplied to the input ports INT1 and INT2 which are referred to as INT1 pulse and INT2 pulse, in the same manner as the sub-routine of FIG. 13. After execution of steps $S_{120}$ and $S_{121}$, the sample values of the $P_1$ and $P_2$ signals are taken as new PC values (step $S_{140}$) and then the stage count value S is detected at the steps $S_{141}$ through $S_{147}$. Then, it is determined whether the PC values taken at the step $S_{140}$ are such values which are to be taken at the respective stage (steps $S_{148}$ through $S_{154}$). By making the above determinations, it can be determined whether the rotary body 10 rotates normally or not. When the PC values are values corresponding to the respective stage count value S, then the operation advances to steps $S_{127}$ through $S_{132}$ for the normal operation. When, to the contrary, the PC values are not equal to values corresponding to the respective count values S, then the operation advances to a step $S_{135}$ at which the ignition is prohibited and then returns to the engine-start sub-routine (step $S_{136}$).

Figure 16:
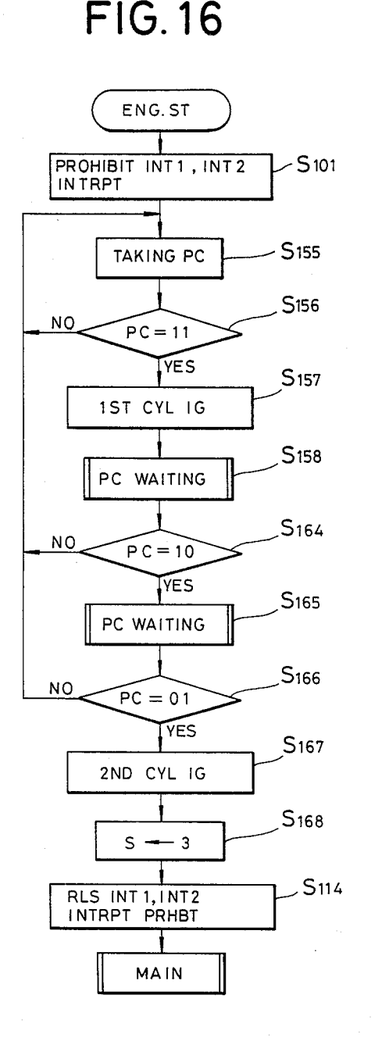
FIG. 16 is a flow chart showing a still further engine-start sub-routine to be executed by the microcomputer of FIG. 4.

In FIG. 16, there is shown an engine-start sub-routine which may be substituted for the sub-routine of FIG. 12. Those steps similar to those in FIG. 12 are designated by the same or similar reference numerals and will not be explained hereinafter.

This sub-routine is initiated by the power supply to the controller 16 and executed in response to clock pulses with a constant frequency. At first, INT1 and/or INT2 interruption is prohibited at a step $S_{101}$. Then the PC values are repeatedly taken (step $S_{155}$) until the PC values become (1,1) (step $S_{156}$). When the PC values become (1,1) the ignition command is issued from the $P_3$ port so as to ignite the first cylinder (step $S_{157}$). Thereafter, a PC waiting sub-routine is executed at the next step $S_{158}$.

Figure 17:
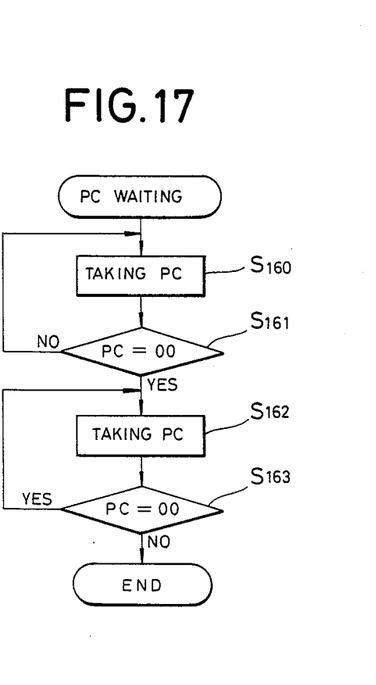
FIG. 17 is a flow chart showing a PC waiting sub-routine which is included by the sub-routine of FIG. 16.

In the PC waiting sub-routine, the PC values are repeatedly taken (step $S_{160}$) until the PC values become (0,0) (step $S_{161}$). When the PC values become (0,0), then new PC values are respectively taken until the PC values become values other than (0,0). When the PC values become values other than (0,0), then the PC waiting sub-routine terminates. By executing the PC sub-routine, the same sample values are avoided from being mistaken as different PC values.

At the preceding step $S_{164}$, the newly taken PC values are determined to be equal to (1,0) or not. In this embodiment, the PC values should be (1,0) after the PC values have taken values (1,1) and thereafter (0,0) in sequence. When, therefore, the PC values are detected not to be equal to (1,0) at step $S_{164}$, the operation returns to the step $S_{155}$ as any abnormality seems to occur. When the PC values are equal to (1,0) at the step $S_{164}$, the PC waiting sub-routine is again executed at a step $S_{165}$ and then it is determined whether the PC values taken at the step $S_{162}$ are equal to (0,1) or not (step $S_{166}$). When the PC values are equal to (0,1) then the normal rotation of the rotary body 10 is confirmed. At this moment, the rotary body 10 takes the TDC position for the second cylinder, so that an ignition command is issued from the output port $P_4$ to ignite the second cylinder (step $S_{167}$). Then, the stage count value S is set to "3" at a step $S_{168}$ and the prohibition for INT1/INT2 interruption is released at a step $S_{114}$ and thereafter the operation advances to the main routine.

With this engine-start sub-routine, the changing manners of the input signals $P_1$ and $P_2$ are observed after the ignition in the first cylinder so as to detect any abnormal rotation of the rotary body 10 thereby to inhibit the ignition for the second cylinder upon detection of the abnormality.

Figure 18:
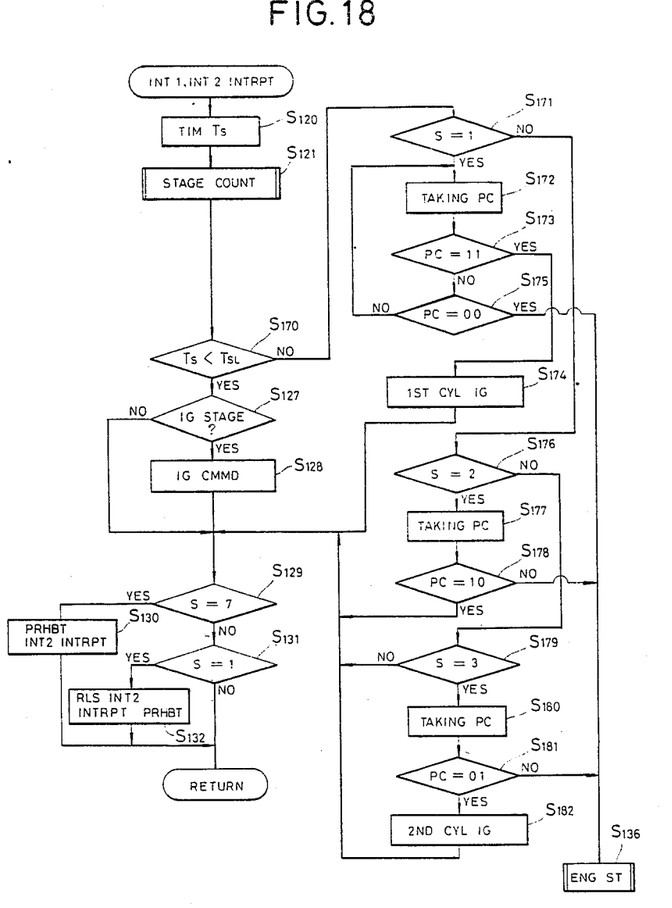
FIG. 18 is a flow chart showing a still further INT-1/INT2 interruption sub-routine.

In FIG. 18, there is shown another INT1/INT2 interruption sub-routine which may be substituted for those of FIGS. 13 and 15. Those steps of this sub-routine corresponding to those in the sub-routine of FIG. 13 are designated by the same or similar reference numerals and will not be explained hereinafter.

This INT1/INT2 interruption sub-routine is initiated in response to either one of the high level pulses INT1 and INT2 supplied to the input ports INT1 and INT2 of the controller 16, while interrupting the main routine. After execution of the steps $S_{120}$ and $S_{121}$, the measured time period $T_S$ is compared with the time period $T_{SL}$ as in the step $S_{28}$ of FIG. 9 (step $S_{170}$). When it is detected that $T_S$ is larger than $T_{SL}$, the engine speed is judged to be lower than the idle speed and the operation advances to a step $S_{171}$. At the step $S_{171}$, it is determined whether the stage count value S is equal to "1" or not. When the stage count value S is determined to be equal to "1", the PC values are taken (step $S_{172}$). When the PC values are determined to be equal to (1,1) (step $S_{173}$), the ignition command is issued from the output port $P_3$ so as to ignite the first cylinder and thereafter the operation advances to a step $S_{129}$. When the PC values become (0,0) without becoming (1,1), the operation advances to the engine-start sub-routine of a step $S_{136}$ (step $S_{175}$). When, at the step $S_{171}$, it has been determined that the stage count value S is not equal to "1", it is determined whether the stage count value S is equal to "2" (step $S_{176}$). When the stage count value S is determined to be equal to "2", the PC values are taken (step $S_{177}$) and it is determined that the taken PC values are equal to (1,0) at a step $S_{178}$. When it is determined that the PC values are equal to (1,0), the operation advances to the step $S_{129}$. When, however, the PC values are determined not to equal (1,0), the operation is made to advance to the engine-start sub-routine of the step $S_{136}$.

When, at the step $S_{176}$, the stage count value S has not been determined to equal "2", a determination is made whether the stage count value S is equal to "3" (step $S_{179}$). When the stage count value S is determined to equal "3", the PC values are taken (step $S_{180}$) and a determination is made whether the PC values are equal to (0,1) corresponding to the state S=3 at a step $S_{181}$. When the PC values are determined to be equal to (0,1), the ignition command is issued for the second cylinder (step $S_{182}$) and then the operation advances to the step $S_{129}$. When, to the contrary, the PC values are not determined to be equal to (0,1), the operation advances to the engine-start sub-routine of the step $S_{136}$.

With this arrangement, the determination of whether the rotation of the rotary body 10 is normal or not is made only when the engine speed is lower than the idle speed i.e. during an unstable condition, whereby the determination is effectively made. When, furthermore, an abnormality is detected, the operation returns to the engine-start sub-routine without issuance of any ignition command, so that the reverse rotation is not promoted by any ignition and the reference angular position can be readily detected.

What is claimed is:

1. A method for determining a reference angular position of a rotary body on which at least two detectable portions are formed spaced apart from each other by a predetermined angle in the rotational direction thereof, by using output signals generated from two detectors spaced apart from each other by said predetemined angle in the vicinity of the locus of said detectable portions along the rotational direction of said rotary body, the output signals of the respective detectors being at a detection level upon the passage of said detectable portions comprising:

a first detection step for detecting that either one of the output signals from said detectors reaches said detection level;

a second detection step for detecting that both output signals from said detectors simultaneously reaches said detection level following the detection of said first detection step; and a determining step for determining that said rotary body reaches said reference angular position upon the detection by said second detection step.

2. A method according to claim 1, in which said determining step includes:

a stage count step for changing a stage count value by a unit value in response to the detection by said first detection step; and a reset step for resetting said stage count value to a reference value in response to the detection by said second detection step.

3. A method according to claim 2, in which said determining means further includes:

an ignoring step for ignoring one of said output signals from said detectors when said stage count value is equal to a preceding value preceding said reference value by said unit value.

4. A method according to claim 2, in which said determining step further includes:

an abnormality determination step for determining an abnormality in the rotation direction of said rotary body when both levels of said output signals are below said detection level when said stage count value is equal to said reference value.

5. A method according to claim 4, in which said rotary body rotates in synchronism with the operation of an engine, and which further comprises:

an ignition prohibition step for prohibiting the ignition of said engine when an abnormal rotation direction is determined in said abnormality determination step.

6. A method according to claim 5, which further comprises:

a further ignition prohibition step for prohibiting the ignition of said engine when the output signal from one of the detectors positioned prior to the other in the normal rotational direction of said rotary body, is below said detection level at the time said stage count value is equal to said preceding value.

7. A method according to claim 2, in which said determining step further includes a further abnormality determination step for determining an abnormality in the rotation of said rotary body when the levels of said output signals from said detectors are not equal to predetermined levels corresponding to the current value of a current stage.

8. A method for determining a normal rotation of a rotary body on which at least two detectable portions are formed spaced apart from each other by a predetermined angle in the rotational direction thereof, by using output signals generated from two detectors spaced apart from each other by said predetermined angle in the vicinity of the locus of said detectable portions along the rotational direction of said rotary body, the output signal level of each of said detectors rising to a detection level upon the passage of each of said detectable portions in the vicinity thereof, which method comprises:

periodically sampling the levels of said output signals to obtain a sample value (x, y), where x corresponds to a sample value of a first of said detectors positioned prior to a second of said detectors in the normal rotational direction of said rotary body and y corresponds to a sample value of said second detector; and determining the normal rotation of said rotary body when the values (x, y) change from values (0, 1) through values (0, 0) to values other than (0, 0) and then to values (1, 1).

9. A method for determining a normal rotation of a rotary body on which at least two detectable portions are spaced apart from each other by a predetermined angle in the rotational direction thereof, using output signals generated from two detectors spaced apart from each other by said predetermined angle in the vicinity of the locus of said detectable portions along the rotational direction of said rotary body, the output signals for the respective detectors reaching a detection level upon the passage of said detectable portions comprising:

periodically sampling the levels of said output signals to obtain sample values (x,y), where x corresponds to an output level sample of one of said detectors positioned ahead of the other of said detectors in the normal rotational direction of said rotary body, and y corresponds to a detection level of said other detector;

a first storage step for storing the values (x, y) as first storage values when (x, y) are not equal to (0, 0);

a first waiting step for waiting for a state that the values (x, y) are equal to (0, 0);

a second waiting step for waiting for a state where the values (x, y) are equal to (0, 0) after the completion of said first waiting step; and a first determining step for determining that said rotary body has rotated in the normal direction when the values (x, y) become (1, 1) after completion of said second waiting step when said first storage values are equal to (0, 1), and for repeating said first storage step through said second waiting step until the values (x, y) become (1, 1).

10. A method according to claim 9, which further comprises:

a second determining step for determining whether the values (x,y) are equal to (0,0) or not when the values (x,y) have not been equal to (1,1) in said first determining step;

a first feed-back step for initiating said first determining step when the values (x,y) have been determined not to be equal to (0,0) in said second determining step while storing the values (x,y) as second storage values; and a second feed-back step for initiating said second waiting step when the values (x,y) have been determined to be equal to (0,0) in said second determining step while replacing said first storage values by the latest one of said second storage values.

* * * * *